United States Patent
Forsberg

(10) Patent No.: US 10,218,565 B2
(45) Date of Patent: Feb. 26, 2019

(54) UNCONDITIONAL AND IMMEDIATE SERVICE CAPABILITIES FOR RULE BASED SERVICES

(75) Inventor: Mikael Forsberg, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 457 days.

(21) Appl. No.: 14/387,914

(22) PCT Filed: Mar. 27, 2012

(86) PCT No.: PCT/EP2012/055402
§ 371 (c)(1),
(2), (4) Date: Sep. 25, 2014

(87) PCT Pub. No.: WO2013/143577
PCT Pub. Date: Oct. 3, 2013

(65) Prior Publication Data
US 2015/0052422 A1 Feb. 19, 2015

(51) Int. Cl.
*H04L 12/24* (2006.01)
*H04L 29/06* (2006.01)
(Continued)

(52) U.S. Cl.
CPC ........ *H04L 41/0803* (2013.01); *G06F 3/0481* (2013.01); *H04L 65/1016* (2013.01); *H04L 65/1096* (2013.01); *H04L 67/306* (2013.01)

(58) Field of Classification Search
CPC ............. H04L 41/0803; H04L 65/1016; H04L 65/1096; H04L 67/306; G06F 3/0481
(Continued)

(56) References Cited

U.S. PATENT DOCUMENTS 6,947,991 B1 * 9/2005 Burton .................. H04L 63/083
707/999.01
2005/0080757 A1 * 4/2005 Sharma ............. G06F 17/30507
(Continued)

FOREIGN PATENT DOCUMENTS

| CN | 1722670 A | 1/2006 |
| CN | 101379757 A | 3/2009 |

(Continued)

OTHER PUBLICATIONS

International Search Report for International Application No. PCT/EP2012/055402 dated Dec. 6, 2012, 4 pages.
(Continued)

*Primary Examiner* — S. Sough
*Assistant Examiner* — Kimberly L Jordan
(74) *Attorney, Agent, or Firm* — Sage Patent Group

(57) ABSTRACT

Methods and apparatus for controlling the presentation of user changeable IP Multimedia Subsystem, IMS, service rules at a user equipment. The service rules, conditions, and/or actions are defined within an XML document maintained within the IMS network. The XML document includes one or more informational elements identifying the service rules that the user can change, which include at least one of an unconditional or immediate based service rule. Upon receipt of the XML document, the user equipment or a web portal, interprets the informational element(s) and presents an indication in relation to whether the service rules are changeable. In response, user defined service rule information may be received and used in changing service rules associated with the user. The user defined service rule information is transmitted to the IMS network for validation and allowable portions of the user defined service rule information are used in updating the service rules.

20 Claims, 5 Drawing Sheets

(51) Int. Cl.
*H04L 29/08* (2006.01)
*G06F 3/0481* (2013.01)

(58) Field of Classification Search
USPC .......................................................... 719/330
See application file for complete search history.

(56) References Cited

U.S. PATENT DOCUMENTS

| | | |
|---|---|---|
| 2006/0153352 A1 | 7/2006 | Schmidt et al. |
| 2010/0157980 A1 | 6/2010 | Ellsworth et al. |
| 2010/0223545 A1* | 9/2010 | Forsberg ........... H04M 3/42153 715/234 |

FOREIGN PATENT DOCUMENTS

| | | |
|---|---|---|
| WO | WO 2007/092573 A2 | 8/2007 |
| WO | WO 2008/104225 A1 | 9/2008 |

OTHER PUBLICATIONS

Written Opinion of the International Searching Authority for International Application No. PCT/EP2012/055402 dated Dec. 6, 2012, 9 pages.
International Preliminary Report on Patentability Authority for International Application No. PCT/EP2012/055402 dated May 28, 2014, 19 pages.
Tsietsi et al: "A Framework for the Management of Operator Policies and User Preferences for Service Compositions in the IP Multimedia Subsystem", Computer Software and Applications Conference Workshops (COMPSACW), 2011 IEEE 35$^{TH}$ Annual, IEEE, Jul. 18, 2011, pp. 54-61.
3GPP TS 22.173 V11.3.0 (Sep. 2011); 3$^{rd}$ Generation Partnership Project; Technical Specification Group Services and System Aspects; IP Multimedia Core Network Subsystem (IMS) Multimedia Telephony Service and supplementary services; Stage 1 (Release 11); 650 Route des Lucioles, Sophia Antipolis, Valbonne, France; 72 pages.
3GPP TS 23.002 V11.2.0 (Mar. 2012); 3$^{rd}$ Generation Partnership Project; Technical Specification Group Services and System Aspects; Network architecture (Release 11); 650 Route des Lucioles, Sophia Antipolis, Valbonne, France; 96 pages.
3GPP TS 24.173 V11.0.0 (Sep. 2011); 3$^{rd}$ Generation Partnership Project; Technical Specification Group Core Network and Terminals; IMS multimedia telephony communication services; Stage 3 (Release 11); 650 Route des Lucioles, Sophia Antipolis, Valbonne, France; 17 pages.
3GPP TS 24.604 V11.0.0 (Sep. 2011) 3$^{rd}$ Generation Partnership Project; Technical Specification Group Core Network and Terminals; Communication Diversion (CDIV) using IP Multimedia (IM) Core Network (CN) subsystem; Protocol specification (Release 11); 650 Route des Lucioles, Sophia Antipolis, Valbonne, France; 67 pages.
3GPP TS 24.611 V11.0.0 (Sep. 2011); 3rd Generation Partnership Project; Technical Specification Group Core Network and Terminals; Anonymous Communication Rejection (ACR) and Communication Barring (CB) using IP Multimedia (IM) Core Network (CN) subsystem; Protocol specification (Release 11); 650 Route des Lucioles, Sophia Antipolis, Valbonne, France; 26 pages.
3GPP TS 24.623 V10.3.0 (Mar. 2012) 3$^{rd}$ Generation Partnership Project; Technical Specification Group Core Network and Terminals; Extensible Markup Language (XML) Configuration Access Protocol (XCAP) over the Ut interface for Manipulating Supplementary Services (Release 10); 650 Route des Lucioles, Sophia Antipolis, Valbonne, France; Mar. 14, 2012; 18 pages.
ETSI 183 023 V2.0.0 (Jun. 2008) "Telecommunications and Internet converged Services and Protocols for Advanced Networking (TISPAN); PSTN/ISDN simulation services; Extensible Markup Language (XML) Configuration Access Protocol (XCAP) over the Ut interface for Manipulating NGN PSTN/ISDN Simulation Services"; 650 Route des Lucioles F-06921 Sophia Antipolis Cedex—France; 8 pages.
First Office Action English language translation, Chinese Patent Application No. 201280071867.5, dated Nov. 1, 2016.

* cited by examiner

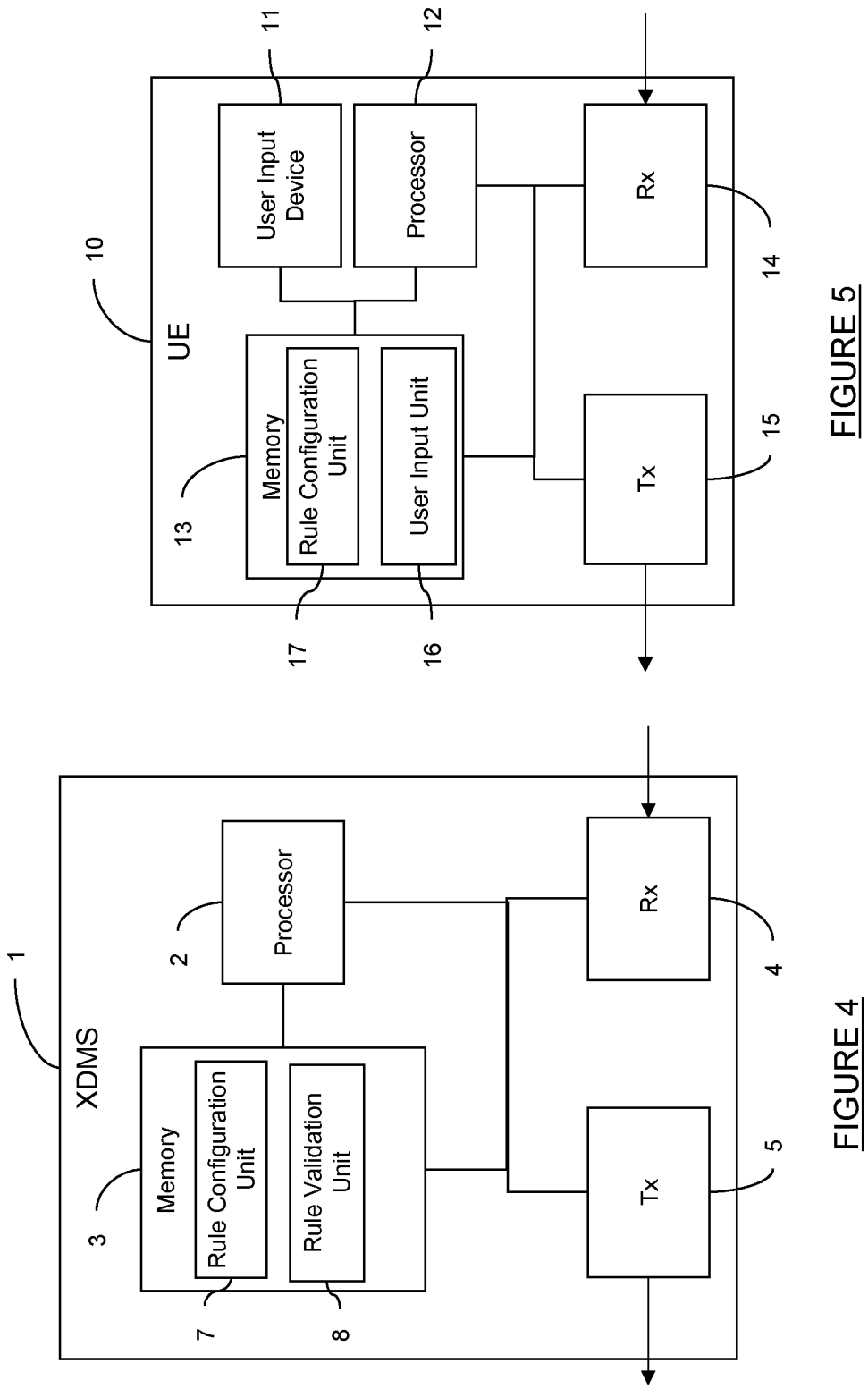

UNCONDITIONAL AND IMMEDIATE SERVICE CAPABILITIES FOR RULE BASED SERVICES

CROSS REFERENCE TO RELATED APPLICATION

This application is a 35 U.S.C. § 371 national stage application of PCT International Application No. PCT/EP2012/055402, filed on 27 Mar. 2012, the disclosure and content of which is incorporated by reference herein in its entirety. The above-referenced PCT International Application was published in the English language as International Publication No. WO 2013/143577 A1 on 3 Oct. 2013.

TECHNICAL FIELD

The present invention relates to the configuration of IP Multimedia Subsystem services and in particular to the configuration of such services using service rules by users across the Ut interface, the service rules being based on unconditional and/or immediate service capabilities.

BACKGROUND

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) and ETSI TISPAN group to provide IP Multimedia services over mobile communication networks. IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and application servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. ASs provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which ASs should be "linked in" during a SIP Session establishment (or indeed for the purpose of any SIP method, session or non-session related). The IFCs are received by the S-CSCF from an HSS during the IMS registration procedure as part of a user's or subscriber's Subscriber Profile.

A Ut interface (or more correctly "reference point") has been specified between the AS and a user equipment (UE) (e.g. 3GPP Technical Specification 23.002). The Ut interface enables a user to manage information relating to his or her services, e.g. creation and assignment of Public Service Identities, management of authorisation policies that are used for example by presence services, conference policy management, etc. The Ut interface allows in particular a user to manipulate Extensible Markup Language (XML) data associated with an AS and which defines how certain services are provided to that user. XML documents are handled by XML Document Management Servers (XDMSs), which are typically co-located with ASs. In use, an XDMS stores service data into a Home Subscriber Server (HSS) (as transparent data), which is then retrieved by the AS at service invocation.

The UE may comprise or represent any device used for communications. Examples of UE that may be used in certain embodiments of the described network(s) are wireless devices such as mobile phones, terminals, smart phones, portable computing devices such as lap tops, handheld devices, tablets, netbooks, computers, personal digital assistants and other wireless communication devices, or wired communication devices such as telephones, computing devices such as desktop computers, set-top boxes, and other fixed communication devices.

ETSI TISPAN has adopted the XML Configuration Access Protocol (XCAP), as specified in IETF RFC 4825, for use over the Ut interface and which facilitates the use of http methods, i.e. GET, PUT, and DELETE, to operate on XML data stored in the HSS, via an XDMS. ETSI 183 023 presents a refined XCAP protocol for manipulating data relating specifically to PSTN/ISDN simulation services that will be provided within Next Generation Networks (NGN). Such services include for example voice mail, call forwarding, call barring, etc, with each service being defined within the standard by an XML "schema" which represents an XML template for incorporation into user XML documents.

The XML documents defining customer services and settings are handled by the XDMS. A so-called "Sh" interface allows the XDMS to communicate with the HSS. A network operator may initially install pre-configured XML data, based upon the standardised XML schema, on a per-user basis into the HSS, and to subsequently amend the installed XML data via the XDMS. The management network additionally provides a mechanism whereby a user can edit his/her associated XML document. For this purpose, a Ut client can be installed within the UE and/or within a web portal. As discussed above, the Ut client uses the XCAP protocol to retrieve (either the whole document or a fragment thereof) and amend the XML document (or fragment) associated with the user. It will be appreciated that the XDMS reacts to a retrieval request from a user via the UE or web portal by obtaining the relevant XML data from the HSS and delivering this to the user via the UE or web portal over the Ut interface.

The Ut client fetches the stored data for the user from the XDMS by sending an XCAP GET request to the XDMS over the Ut interface. An Aggregation Proxy may be used to authenticate these requests. The XDMS fetches the data from the HSS over the Sh interface and sends it back to the Ut client in a Ut response message. The Ut client displays information and options to the user. Whilst the XDMS is able to allow and reject requests by a user to change the XML data, as currently defined the relevant standard does not have any mechanism to include information related to unconditional or immediate based service rules or to limit further changes to these types of service rules by the user. A user can download to the UE or web portal the XML document relating to their service set, with the UE or web portal rendering the service set to the user by displaying all service settings, regardless of whether or not the XDMS will actually accept a request from the user to change their service settings and/or associated service rules. Such an approach will inevitably result in unhappy and confused users.

SUMMARY

In order to address or solve the problem identified above, it is proposed to introduce into the XML document structure (i.e. the standardised schema) an informational element or elements that identifies (identify) the service rules that a user is allowed to change such as unconditional and immediate type service rules. The elements are interpreted by either the UE or a web portal on behalf of the user and an indication of whether the service rules are changeable is displayed to the user by the UE or web portal. New informational elements related to new service rules can also be included that are identified by the UE or web portal as changeable or not. For example, informational elements related to unconditional and immediate type service rules can be defined by the operator and set to be changeable or not, thus informing the user, UE or web portal about allowable/disallowed conditions and service rules.

According to a first aspect of the invention there is provided a method of controlling user changeable IMS service rules associated with a user. The service rules are defined within an XML document and maintained within the IMS network. The method includes requesting service rule information associated with the user from an XDMS server over a Ut interface of the IMS network. The XML document or a fragment thereof is received over the Ut interface. The XML document or fragment thereof includes one or more informational elements identifying whether a corresponding service rule is changeable by the user. At least one of the informational elements corresponds to at least one of an unconditional or immediate based service rule. The informational elements are interpreted and an indication is presented to the user in relation to whether the corresponding service rules can be changed. In response, user defined service rule information is received, in which the user defined service rule information includes changes to the service rules associated with the user. The user defined service rule information is transmitted to the XDMS server, over the Ut interface, for use by the IMS network in updating the service rules for the user. According to a second aspect of the invention, there is provided a method, performed by an XDMS server, for controlling user changeable IMS service rules associated with a user. The service rules are defined within an XML document and maintained within the IMS network. The XDMS server receives a request, over a Ut interface of the IMS network, for service rules associated with the user. The XDMS server transmits, over the Ut interface, the XML document or a fragment thereof including one or more informational elements identifying whether a corresponding service rule is changeable by the user. At least one of the informational elements corresponds to at least one of an unconditional or immediate based service rule. The XDMS server receives user defined service rule information, in which the user defined service rule information includes changes corresponding to the service rules associated with the user. The XDMS server validates the service rules associated with the user defined service rule information to determine the allowable changes to the service rules. Once validated, the XDMS server updates the service rules associated with the user.

As an option, the user defined service rule information includes new service rules defined by the user. The user defined service rule information may include data representative of changes to changeable service rules associated with the user. The user defined service rule information may include service rule information based on unconditional or immediate type service rules, or new unconditional or immediate type service rules. In addition or alternatively, the user defined service rule information includes one or more user defined informational elements associated with changeable service rules or new service rules.

Optionally, the informational element(s) specify conditions for whether changes to the corresponding service rule is allowed and/or disallowed. Additionally, the at least one informational element based on at least one unconditional or immediate type service rule(s) includes an indication whether the corresponding service rule(s) is changeable or not. As an option, the indication whether the corresponding service rule(s) is changeable or not may include a flag having a value of true if the corresponding service rule(s) is changeable, or a value of false if the corresponding service rule(s) is not changeable.

As an option, the method(s) may include notifying the user that at least a portion of the user defined service rule information associated with an unchangeable service rule, or an unchangeable unconditional or immediate type service rule is disallowed. The XDMS server may transmit a notification to the user that a user defined informational element associated with an unchangeable unconditional or immediate based service rule is disallowed.

As an option, the method may be performed by a UE or by a web portal on behalf of the user or the UE of the user. Additionally, the methods may include the user equipment or the web portal validating the user defined service rule information or user defined informational elements to determine the allowable changes to the service rules associated with the user. Further, the UE or the web portal may transmit the allowable user defined service rule information to the XDMS server. The XDMS server may be in communication with a UE or the XDMS server is in communication with a web portal on behalf of the user or UE of the user.

Optionally, the indication presented to the user in relation to whether the corresponding service rules can be changed includes displaying to the user a listing of whether service rules are changeable, a listing of changeable service rules, and/or a listing of options related to the corresponding service rules or changeable service rules.

According to a third aspect of the invention, there is provided an apparatus configured to operate as a user terminal for controlling user changeable IMS service rules associated with a user. The service rules are defined within an XML document and maintained within the IMS network. The apparatus includes a receiver, a transmitter, a processing unit, and a memory unit, wherein the processing unit is coupled to the receiver, transmitter, and memory unit. The transmitter is configured for requesting the service rules associated with the user from an XDMS server over a Ut interface of the IMS network. The receiver is configured for receiving, over the Ut interface, the XML document or a fragment thereof comprising one or more informational elements identifying whether a corresponding service rule is changeable by the user. At least one of the informational elements corresponds to at least one of an unconditional or immediate based service rule. The processing unit is configured for interpreting said informational elements and presenting to the user an indication in relation to whether the corresponding service rules can be changed. The processing unit is further configured for receiving user defined service rule information, in which the user defined service rule information includes data representative of changes to the service rules associated with the user. The transmitter is configured for transmitting to the XDMS server, over the Ut interface, the user defined service rule information for use by the IMS network in updating the service rules associated with the user.

According to a fourth aspect of the invention there is provided an apparatus configured to operate as a web portal for controlling user changeable IMS service rules associated with a user. The service rules are defined within an XML document and maintained within the IMS network. The apparatus includes a receiver, a transmitter, a processing unit, and a memory unit, where the processing unit is coupled to the receiver, transmitter and the memory unit. The transmitter is configured for requesting the service rules associated with the user from an XDMS server over a Ut interface of the IMS network. The receiver is configured for receiving, over the Ut interface, the XML document or a fragment thereof comprising one or more informational elements identifying whether a corresponding service rule is changeable by the user. At least one of the informational elements corresponds to at least one of an unconditional and immediate based service rule. The processing unit is configured for interpreting said informational elements and presenting to the user an indication in relation to whether the corresponding service rules can be changed. The receiver is further configured for receiving user defined service rule information, in which the user defined service rule information includes data representative of changes to the service rules associated with the user. The transmitter is further configured for transmitting to the XDMS server, over the Ut interface, the user defined service rule information for use by the IMS network in updating the service rules associated with the user.

As an option, the apparatus may operate as a user equipment or as a web portal and may be further configured for validating the user defined service rule information to determine the allowable changes to the associated service rules. Additionally, the transmitter may be further configured for transmitting to the XDMS server, over the Ut interface, allowable portions of the user defined service rule information for use by the IMS network in updating the service rules associated with the user.

According to a fifth aspect of the invention there is provided an apparatus configured to operate within an IMS network as an XDMS server. The apparatus being arranged in use to manage an XML document defining IMS service rules associated with a user. The XML document or a fragment thereof includes one or more informational element(s) identifying whether a corresponding service rule is changeable by the user. At least one of the informational elements corresponds to at least one of an unconditional or immediate based service rule, and the apparatus being further arranged to accept or deny user requests to change the service rules associated with the user based on user defined service rule information.

As an option, the apparatus is configured to receive a request, over a Ut interface of the IMS network, for service rules associated with the user. The apparatus may be further configured to transmit, over the Ut interface, the XML document or a fragment thereof comprising one or more informational elements identifying whether a corresponding service rule is changeable by the user. At least one of the informational elements corresponds to at least one unconditional or immediate based service rule. The apparatus receives user defined service rule information in response to sending the one or more informational elements to the user. The user defined service rule information includes changes to the service rules associated with the user. The apparatus is further configured to validate the user defined service rule information to determine the allowable changes to the associated service rules. The apparatus is configured to update the XML document to reflect changes to the service rules based on allowable portions of the user defined service rule information.

As an option, the apparatus is configured for transmitting a notification to the user or a web portal that a portion of the user defined service rule information associated with an unchangeable unconditional based service rule or unchangeable immediate based service rule is disallowed.

Embodiments of the present invention can provide a relatively simple and efficient mechanism for allowing an operator to notify the UE, web portal or user as to whether the user is allowed to change conditions, service rules, or create new service rules, that are unconditional or immediate for a rule based service. By way of example only, in the Communication Diversion (CDIV) service an operator might want to restrict the user to divert to voice mail directly without that the terminal first rings, which may be defined by a non-changeable unconditional or immediate based service rule. However, the CDIV service as defined in 3GPP TS 24.604 (or any other service for that matter) does not specify this possibility when it defines the allowed conditions and actions in the communication-diversion-serv-cap schema.

The above methods, apparatus and mechanisms can be used for recognising and treating unconditional and immediate CDIV service rules (and service rules for other IMS services) accordingly, and for notifying the user accordingly as to which unconditional and immediate based service rules are changeable or not.

BRIEF DESCRIPTION OF THE DRAWINGS

FIG. 4 illustrates schematically an example of an XDMS suitable for implementing the methods described herein;

FIG. 5 illustrates schematically an example of a UE suitable for implementing the methods described herein;

DETAILED DESCRIPTION

Figure 1:
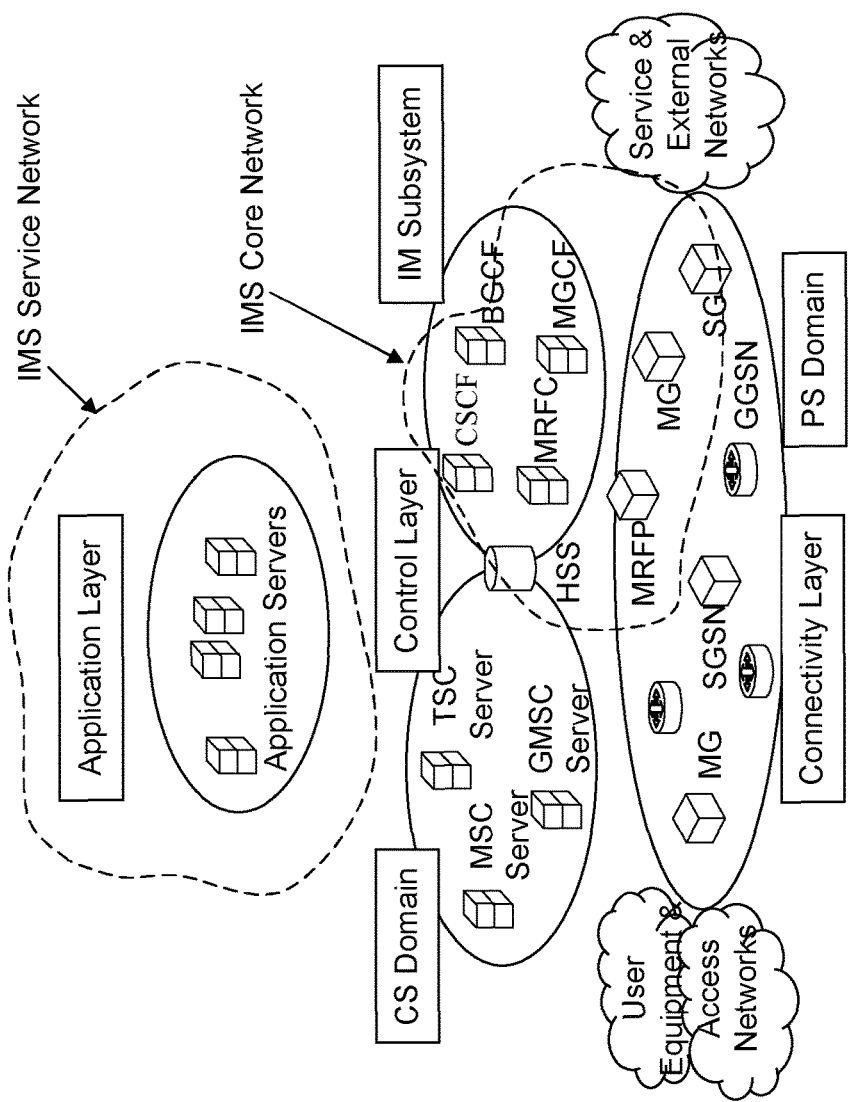
FIG. 1 illustrates schematically the integration of IMS into a 3G mobile communications system.

As has already been described, an XDMS (SIP Application Server) is provided to maintain XML documents defining services of associated users. The XML documents are stored within an HSS and are retrieved by appropriate SIP ASs at service invocation in order to allow the ASs to provide services to users according to user subscriptions and network policy. It is to be appreciated that a user subscription may be associated with one or more users or even a group of users (e.g. a subscription may relate to a group number that covers more than one user).

By way of example, an XML document is created for each user, subscriber, or subscription specifying PSTN/ISDN simulation services provided for the subscription associated with the user(s). Each available simulation service is specified within an XML document according to an XML "schema" (the schemas being defined in the relevant standard). In addition, an XML document may contain a "common parts" section (again according to the standardised common parts) which is imported into each of the service specific schemas. The XCAP protocol is used by a Ut client (at the UE or at the web portal) to access and change the various sections within a user's XML document(s).

In order to address the problems identified above, it is proposed to introduce into the XML document structure (i.e. the standardised schema) an informational element or elements which identifies (identify) the service rules that a user is allowed to change within their subscription. The service rule(s) may include one or more conditional service rule(s) as well as one or more unconditional and immediate based service rule(s). The elements are interpreted by either the UE or a web portal on behalf of the UE and an indication of whether the service rules are changeable or not are displayed to the user.

The supplementary services that are supported by IMS as defined in 3GPP TS 22.173 (V11.3.0) and 3GPP TS 24.173 (V11.0.0). For example, the standardized supplementary services supported by IMS include, but are not limited to, Originating Identification Presentation (OIP), Originating Identification Restriction (OIR), Terminating Identification Presentation (TIP), Terminating Identification Restriction (TIR), Communication Diversion (CDIV), Communication Hold (HOLD), Communication Barring (CB), Message Waiting Indication (MWI), Conference (CONF), Explicit Communication Transfer (ECT), Advice Of Charge (AOC), Communication Waiting (CW), Flexible Alerting (FA), Communication Waiting (CW), Customized Alerting Tones (CAT), and Customized Ringing Signal (CRS). In addition to these standardized supplementary services, the vendor of an IMS AS can configure an AS so as to implement additional, vendor specific services or service rules. An example of such a vendor specific service is the Flexible Communication Distribution service.

By way of example only, the CDIV service, as defined in 3GPP TS 24.604 (V11.0.0), contains a rule set that specifies how the CDIV service reacts to external stimuli. The rule set includes a list of service rules. The rule set of the CDIV service enables a user to divert/re-direct an incoming communication that fulfils certain conditions to another destination. Similarly, the CB service, as defined in 3GPP TS 24.611 (V11.0.0), contains a rule set that specifies how CB services react to external stimuli. Examples of CB services include Incoming CB (ICB) for rejecting incoming communications that fulfil certain conditions on behalf of the user, Anonymous Communication Rejection (ACR) allowing barring of incoming communications from an anonymous originator, and Outgoing CB (OCB) for rejecting outgoing communications that fulfil certain conditions.

It is proposed herein to extend the rule set for supplementary services to include unconditional and immediate service rules, which may be changeable by a user. This is achieved by defining a set of new service capabilities that makes it possible for an operator to let the UE or user know if unconditional or immediate service rules (e.g. unconditional or conditional CDIV or CB service rules) are allowed. The same type of service capabilities are also applicable for other rule based services such as FCD and those outlined above, or future rule based services and the like.

An unconditional service rule may comprise or represent a service rule without conditions. For example, using the CDIV service by way of example only, an unconditional CDIV service rule may be based on a rule that diverts a call unconditionally, that may be changed or may not be changed by the user, may take the form:

```
<ss:communication-diversion active=true>
    <cp:ruleset>
        <cp:rule id="unconditional">
            <cp:conditions>
            </cp:conditions>
            <cp:actions>
                <ss:forward-to>
                    <ss:target> sip:assistant@myoffice.com
                    </ss:target>
                </ss:forward-to>
            </cp:actions>
        </cp:rule>
    </cp:ruleset>
</ss:communication-diversion>
```

In this case, this CDIV service rule will always divert calls to the assistant (assistant@myoffice.com).

An immediate service rule may comprise or represent a service rule that acts "immediately" on receipt of a SIP message (e.g. a SIP INVITE message). Immediate rules may have at least one condition. For example, using the CDIV service by way of example only, an immediate CDIV service rule for diverting a video call, which may be changed or may not be changed by the user, may take the form:

```
<ss:communication-diversion active="true">
    <cp:ruleset>
        <cp:rule id="video">
            <cp:conditions>
                <media>video</media>
            </cp:conditions>
            <cp:actions>
                <forward-to>
                    <target>sip:alice@example.com</target>
                </forward-to>
            </cp:actions>
        </cp:rule>
    </cp:ruleset>
</ss:communication-diversion>
```

In this case, all video calls are diverted to alice, but non-video calls are not diverted, for example pure audio calls.

The XML schema and service capabilities schema can be extended to include extensions such as additional informational elements that indicate the unconditional and/or immediate service rules that a user may or may not change. The schema may include informational elements representing unconditional and immediate service capabilities in relation to corresponding unconditional and/or immediate service rules. The UE or the web portal can be configured to interpret the information element(s) contained within a retrieved XML document or document fragment, and display to the user an indication in relation to whether the corresponding service rules are changeable including whether the service rules based on the unconditional and/or immediate service capabilities are changeable. If these extensions are not included in the XML document or fragment thereof, then the Ut client will present all available options/rules for a given service, ensuring that Ut clients supporting the extensions (e.g. one or more informational element(s) representing one or more unconditional and/or immediate service capabilities) are compatible with XDMSs that do not support the extensions. The extensions can be added so that legacy Ut clients not supporting these extensions do not reject a response originating at an XDMS that does support the extensions. It is noted that web portals may be used with legacy UEs to interpret the extended informational element(s) and display to the user whether the service rules based on unconditional and/or immediate service capabilities are changeable. This removes the need to update UEs immediately when new service rules or new service capabilities such as unconditional and/or immediate based service capabilities are included into the rule set or set of rules associated with the user. These may be included into the XML document or fragment thereof by the IMS network. It is noted that if a Ut client does not support the extension and seeks to change a service capability or service rule that the subscription does not allow, the XDMS will validate and reject that request.

By way of example only, the methods as described herein may be implemented when the service capabilities for services such as the CDIV service as specified in 3GPP TS 24.604, which are extended to define additional unconditional and immediate service capabilities for use with unconditional and immediate based service rules, respectively. By way of example only, the additional service capabilities in the current CDIV service XML schema (e.g. the existing 24.604_serv_cap_.xsd schema) may be extended by including serv-cap-unconditional and serv-cap-immediate capabilities and may take the form:

```
<xs:element name="serv-cap-conditions" minOccurs="0">
  <xs:complexType>
    <xs:sequence>
      <xs:element name="serv-cap-unconditional"
         type="ss:provisioned-type" minOccurs="0"/>
      <xs:element name="serv-cap-immediate"
         type="ss:provisioned-type" minOccurs="0"/>
      <xs:element name="serv-cap-anonymous"
         type="ss:provisioned-type" minOccurs="0"/>
      <xs:element name="serv-cap-busy"
         type="ss:provisioned-type" minOccurs="0"/>
      <xs:element name="serv-cap-external-list"
         type="ss:provisioned-type" minOccurs="0"/>
      <xs:element name="serv-cap-identity" type =
         "ss:provisioned-type" minOccurs="0"/>
      <xs:element name="serv-cap-media"
         type="ss:supported-media-type" minOccurs="0"/>
      <xs:element name="serv-cap-not-registered" type =
         "ss:provisioned-type" minOccurs="0"/>
      <xs:element name="serv-cap-no-answer" type =
         "ss:provisioned-type" minOccurs="0"/>
      <xs:element name="serv-cap-not-reachable"
         type="ss:provisioned-type" minOccurs="0"/>
```

-continued

```
      <xs:element name="serv-cap-presence-status"
         type="ss:provisioned-type" minOccurs="0"/>
      <xs:element name="serv-cap-rule-deactivated"
         type="ss:provisioned-type" minOccurs="0"/>
      <xs:element name="serv-cap-validity"
         type="ss:provisioned-type" minOccurs="0"/>
    </xs:sequence>
  </xs:complexType>
```

This XML schema defines the service capabilities, which are represented by a listing of one or more informational element(s) (e.g. <xs:element name=" . . . ">). In this XML schema, the informational element(s) defining the additional unconditional service capability for the CDIV service may take the form:

```
<xs:element name="serv-cap-unconditional"
   type="ss:provisioned-type"minOccurs="0"/>
```

The informational element(s) defining the additional immediate service capability for the CDIV service XML schema may take the form:

```
<xs:element name="serv-cap-immediate" type="ss:provisioned-type"
   minOccurs="0"/>
```

The unconditional and/or immediate service capabilities are included in the XML document or fragment thereof when service rules based on these capabilities are required by a subscription associated with a user. In addition to conditional service capabilities, the unconditional and/or immediate service capabilities are represented by informational element(s) and included in the XML document or fragment thereof and transmitted to the user by the XDMS. These are provided in the form of a listing of informational elements, which include an indication of whether the service rules based on the unconditional and/or immediate service capabilities are changeable or not.

The XML document may define a rule set for the service such that the document contains a listing of one or more informational element(s) listing those conditions and/or actions for the service which the user is allowed or disallowed to change. The UE or web portal at the Ut client may be able to understand the additional informational elements representing the unconditional and/or immediate service capabilities, and will display these to the user via a user interface as appropriate. By way of example only, for the above CDIV service XML schema an operator may set an indicator within the information element(s) of the XML document or fragment thereof to represent which service rules are changeable or not. As an example, the service capabilities for unconditional and/or immediate may include an indicator that is set to a value representing "false", which indicates that changes to the service rules, conditions or actions related to these service rules or capabilities are disallowed, whilst allowing changes to all other conditions and actions by setting the indicator to a value representing "true". In this case, the XML document or fragment thereof may take the form:

```
<communication-diversion-serv-cap active="true">
  <serv-cap-conditions>
```

```
        <serv-cap-unconditional provisioned="false"></serv-cap-
           unconditional>
        <serv-cap-immediate provisioned="false"></serv-cap-
           immediate>
        <serv-cap-anonymous provisioned="true"></serv-cap-
           anonymous>
        <serv-cap-external-list provisioned="false"></serv-cap-
           external-list>
        <serv-cap-identity provisioned="true"></serv-cap-
           identity>
        <serv-cap-media>
           <media>audio</media>
           <media>video</media>
        </serv-cap-media>
        <serv-cap-presence-status provisioned="true"></serv-
           cap-presence-status>
        <serv-cap-rule-deactivated provisioned="true"></serv-
           cap-rule-deactivated>
        <serv-cap-validity provisioned="true"></serv-cap-
           validity>
     </serv-cap-conditions>
     <serv-cap-actions>
        <serv-cap-target>
           <telephony-type/>
        </serv-cap-target>
        <serv-cap-notify-caller provisioned="true">
           </serv-cap-notify-caller>
        <serv-cap-notify-served-user provisioned="true">
           </serv-cap-notify-served-user>
        <serv-cap-notify-served-user-on-outbound-call
           provisioned="true">
           </serv-cap-notify-served-user-on-outbound-call>
        <serv-cap-reveal-identity-to-caller provisioned="true">
           </serv-cap-cap-reveal-identity-to-caller>
        <serv-cap-reveal-served-user-identity-to-caller
           provisioned="true">
           </serv-cap-reveal-served-user-identity-to-caller>
        <serv-cap-reveal-identity-to-target provisioned="true">
           </serv-cap-reveal-identity-to-target>
     </serv-cap-actions>
</communication-diversion-serv-cap>
```

The informational element(s) defining the unconditional service capability in the XML document or fragment thereof when changes to the corresponding CDIV rule(s) by a user are disallowed may take the form:

```
     <serv-cap-unconditional provisioned="false"></serv-cap-
        unconditional>
```

The informational element(s) defining the unconditional service capability includes an indication in the form of a flag with a value set to "false", indicating the associated service rule is not changeable.

The informational elements defining the unconditional service capability in the XML document or fragment thereof when changes to the corresponding CDIV rule(s) by a user are allowed may take the form:

```
     <serv-cap-unconditional provisioned="true"></serv-cap-
        unconditional>
```

The informational element(s) defining the unconditional service capability includes an indication in the form of a flag with a value set to "true", indicating the associated service rule is changeable.

The informational elements defining the immediate service capability in the XML document or fragment thereof when changes to the corresponding CDIV rule(s) by a user are disallowed may take the form:

```
     <serv-cap-immediate provisioned="false"></serv-cap-
        immediate>
```

The informational element(s) defining the immediate service capability includes an indication in the form of a flag with a value set to "false", indicating the associated service rule is not changeable.

The informational element(s) defining the immediate service capability in the XML document or fragment thereof when changes to the corresponding CDIV rule(s) by a user are allowed may take the form:

```
     <serv-cap-immediate provisioned="true"></serv-cap-
        immediate>
```

The informational element(s) defining the immediate service capability includes an indication in the form of a flag with a value set to "true", indicating the associated service rule is changeable.

Although the indicator or indication may take the form of a flag with a value set to "true" or "false", it is to be appreciated that this indication may represented by any data that can be used to recognise whether the associated rule is changeable or not (allowable or disallowed). For example, the indication may take the form of a first value indicating the corresponding service rule(s) is changeable and a second value indicating the corresponding service rule(s) is not changeable. As further examples, an indicator may take the form of binary numbers 1 or 0, or strings "on" or "off", "y" or "n", "blue" or "red", or any other data that may be used to recognise whether the associated rule is changeable or not, respectively.

When the UE or a web portal is configured to recognise these informational element(s) or additional service capabilities in the XML document or fragment thereof, then the UE or web portal can display to the user whether the service rules corresponding to the informational elements are changeable or not. The UE or web portal may be configured to display an indication in relation to whether only the corresponding service rules are changeable, thus avoiding the user from inadvertently changing a non-changeable service rule. The indication presented to the user in relation to whether the corresponding service rule(s) can be changed may include displaying to the user a listing of whether the service rule(s) are changeable, a listing of changeable service rule(s), and/or a listing of options related to the corresponding service rule(s) or changeable service rule(s) related to the services or service rules that the user may change.

For example, if the user is not allowed to use an unconditional service rule (e.g. service rules based on Call Forwarding Unconditional (CFU)), then the corresponding informational element(s) will indicate the corresponding service capability to be non-changeable. This may be interpreted at the web portal or UE such that the graphical user interface of the web portal or UE may not present an option for configuring the unconditional service rule. Instead, the web portal or UE may present to the user other options related to the rule such as to divert based on media, identity or time conditions.

By presenting an indication of which unconditional or immediate service rules and options thereof are changeable, this avoids the XDMS from invalidating a request to change a service rule or include a new service rule into the service rules associated with the user, which improves efficiency and customer satisfaction.

Figure 2:
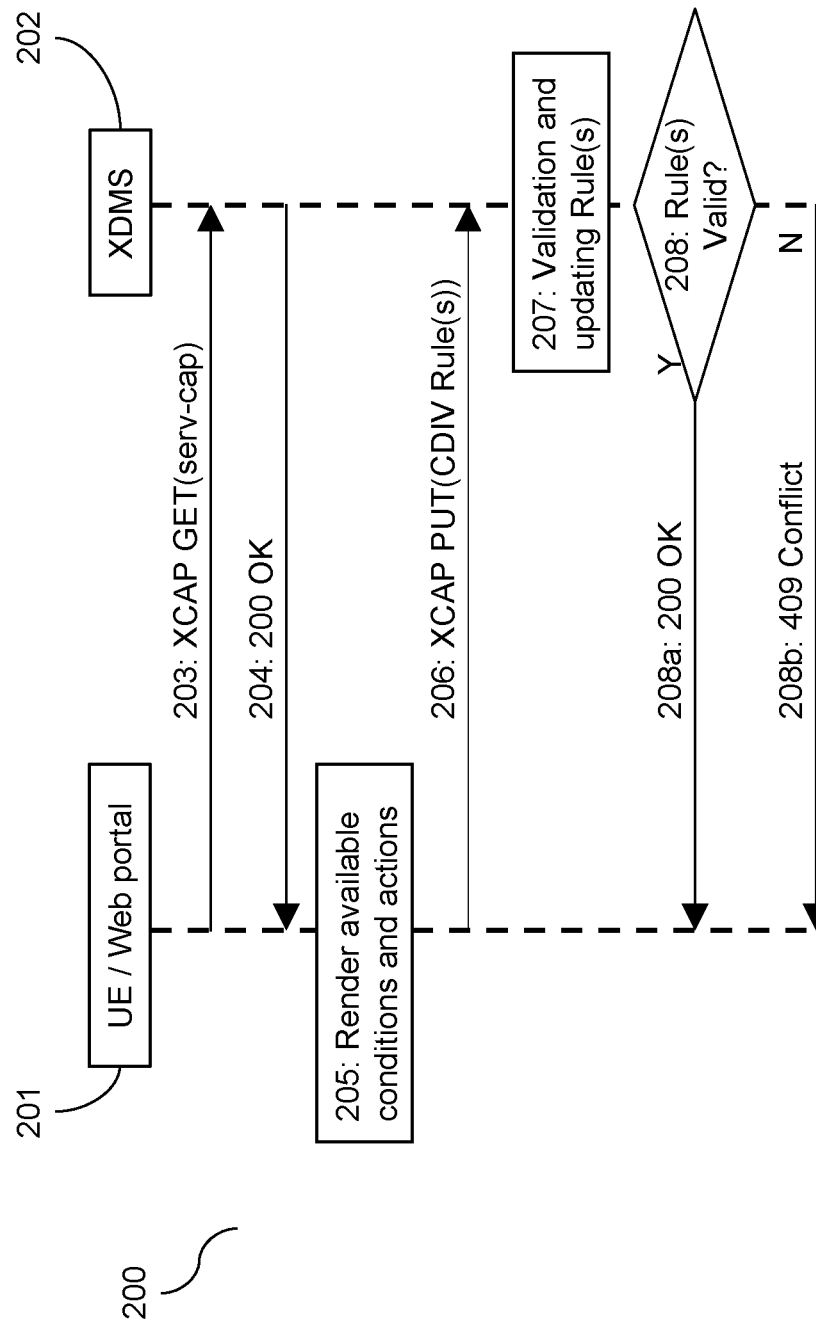
FIG. 2 is a signalling flow diagram illustrating an example of a process of identifying information elements that indicate changeable service rules according to the invention.

FIG. 2 is a signal flow diagram illustrating a process 200 associated with presenting changeable service rules or service capabilities to a user and processing the changes, if any. In step 203, a Ut client of the UE 201 or web portal sends, over a Ut interface to an XDMS 202, a GET request message (e.g. XCAP GET(serv-cap)) for requesting data representative of the service rules associated with the user. The data may be presented as an XML document or fragment thereof with a listing of service capabilities represented by informational elements. The service rules may be requested for a particular service, e.g. CDIV or CB supplementary service, one or more services, or all the services associated with the subscription of the user. This information takes the form of an XML document or fragment thereof in relation to the service rule set applied for that user and the corresponding service(s) requested (e.g. the CDIV or CB supplementary services, etc.)

On receiving the GET request message, the XDMS 202 retrieves the related service rule information in the form of the XML document or a fragment thereof. The XDMS may obtain the XML document or fragment thereof from an HSS over a Sh interface. In step 204, the XDMS 202 sends to the UE or web portal 201 a response message (e.g. 200 OK) including the XML document or fragment thereof. The XML document or fragment thereof includes one or more informational element(s) corresponding to the service rules (e.g. service capabilities, conditions, and actions) associated with the user and/or the service(s) that are requested.

On receipt of the XML document or fragment thereof, in step 205, the UE or web portal 201 renders (interprets) the informational elements within the XML document and displays to the user an indication of the conditions, service rule information, options, and/or actions that are changeable by the user. If the UE or web portal 201 is able to interpret the informational elements related to unconditional and/or immediate service capabilities, then the service rules, conditions, options or actions associated with these will be displayed as changeable if the service rules based on these informational elements are allowed to be changed by the user, or non-changeable if changes to the service rules based on these elements are disallowed by the user. Alternatively the UE or web portal may only present the options or service rules that the user is allowed to use and/or change, where non allowed options or service rules are either not shown at all or, for example, may be shown as gray-marked and not selectable.

If the UE or web portal 201 is a legacy system, and is not able to interpret the informational elements based on unconditional and/or immediate service capabilities, then the service rules, conditions, options or actions associated with these capabilities will be displayed as changeable regardless of whether the corresponding service rules are allowed to be changed by the user. This allows backwards compatibility. If the informational elements based on unconditional and/or immediate service capabilities (e.g. serv-cap-unconditional and/or serv-cap-immediate) are not included in the XML document or fragment thereof, then the UE or web portal 201 may indicate that the related service rules, options or actions are allowed to be changed.

The user is able to identify the service rules, options, conditions, actions, or service capabilities that can be changed and choose to change these or add new service rules, conditions, options, actions etc. Should the user wish to change the service rules or to add new service rules, then the UE or web portal may receive from the user data representative of the various changes to the service rules. These changes may be generated by the UE or the web portal to form user defined service rule information, which includes data representative of the changes, additions or insertions the user has made to the service rules or service rule set associated with the user. This may be in the form of new service rule(s) or new option(s), condition(s) or action(s) associated with one or more service rule(s), or user defined informational element(s) associated with one or more service rule(s), or changed service rule(s) etc.

As an example, the above immediate CDIV service rule for diverting a video call, where video calls are diverted to alice, may be displayed to the user as a changeable service rule. This means the informational element(s) representing the immediate service capability corresponding to this service rule in the XML document or fragment thereof may include an indication in the form of a flag with a value set to "true". The service rules, conditions, or options related to this CDIV service capability have been presented to the user as changeable. In this case, the user may select to change the person that the video calls are diverted to from <alice@example.com> to <bob@example.com>, which will result in changing the target of the service rule to <target> sip:bob@example.com </target>. The user defined service information may include data representative of the changed CDIV service rule for diverting the video call, or data representative of only the changes made to the changed portions of the CDIV service rule or changed options. The user defined service information may be based on the XML format or schema used to represent service rules, actions, conditions and/or service capabilities.

In step 206, the UE or web portal 201 transmits one or more PUT request message(s) (e.g. XCAP PUT(CDIV Rule(s))) including the user defined service rule information to the IMS network. The user defined service rule information can be interpreted and used in changing the rule set and/or the associated service rule(s) of the user's subscription in the IMS network. The XCAP PUT request message may include all the needed user defined service rule information, or several XCAP PUT request messages may be used to relay the changes the user requests. The user defined service rule information may include one or more user defined service rule(s) or new service rule(s), changes to current service rules. The user defined service rule information may further include user defined informational element(s) related to service rule(s) or service capabilities associated with the user that the user wishes to change, which may be interpreted by the IMS network when changing the corresponding service rule(s).

On receipt of the PUT request message at the XDMS 202, in step 207, the XDMS processes the user defined service rule information (e.g. user defined service rule(s), new service rule(s), changes to associated service rules, etc.) by validating whether the changes or additions to the service rules as defined by the user defined service rule information are allowable or not. In step 208, if the user defined service rule information defines allowable changes (e.g. the user defined service rule(s), new service rule(s), changes to service rule(s) or service capabilities are allowable) then the XDMS 202 updates and/or inserts the corresponding service rules into the subscription associated with the user. This may be performed by updating the corresponding XML documents or fragments thereof at the HSS accordingly. For example, having the changes to the service rules associated with the user reflected in the XML document(s) or fragments thereof stored on the HSS on behalf of the user. The XDMS 202 transmits an acknowledgment message (e.g. 200 OK) to the UE or web portal 201 indicating that the service rule(s) or requested changes are acceptable.

However, in step 208, the XDMS 202 checks whether the service rules related to the user defined service rule information are valid or not. In step 208a, if a portion of the user defined service rule information is allowable (the service rules associated with changes represented by a portion of the user defined service rule information are valid and allowable) then the XDMS 202 updates and/or inserts the corresponding allowable service rules into the subscription associated with the user. This may be performed by updating the HSS accordingly. For example, having the changes to the allowable service rules associated with the user reflected in the XML document(s) or fragments thereof stored on the HSS on behalf of the user. The XDMS 202 may transmit an acknowledgment message (e.g. 200 OK) to the UE or web portal 201 indicating that the portion of the user defined service rule information or the allowable service rule(s) or requested changes are acceptable.

In step 208b, if at least a portion of the user defined service rule information (e.g. all or some of the requested service rule(s) changes are not allowed to be changed or are invalid based on the subscription associated with the user), then the XDMS 202 transmits a negative response message (e.g. 409 Conflict) to the UE or web portal 201 indicating that the requested changes to the corresponding service rule(s) are not allowed. If the user attempted to change an unconditional and/or an immediate service rule that is not allowed to be changed, then this negative response message may be presented to the user indicating that changes to an unconditional and/or immediate service rule was attempted but not allowed. This added check catches any UEs or web portals 201 that are legacy systems that cannot interpret additional service capabilities such as the unconditional and/or immediate service capabilities.

By way of example, a negative response message may be a 409 Conflict message, which may take the form:

```
<?xml version="1.0" encoding="UTF-8"?><xcap-error
xmlns="urn:ietf:params:xml:ns:xcap-error"><constraint-
failure phrase="Failed to meet an application constraint:
The condition <condition> is not allowed."/></xcap-error>
```

The variable <condition> contains the actual condition that is not allowed to be used by the user, which may include any of the conditions from the list of conditions of the current MTAS 409 conflict responses in addition to unconditional and/or immediate.

Figure 3:
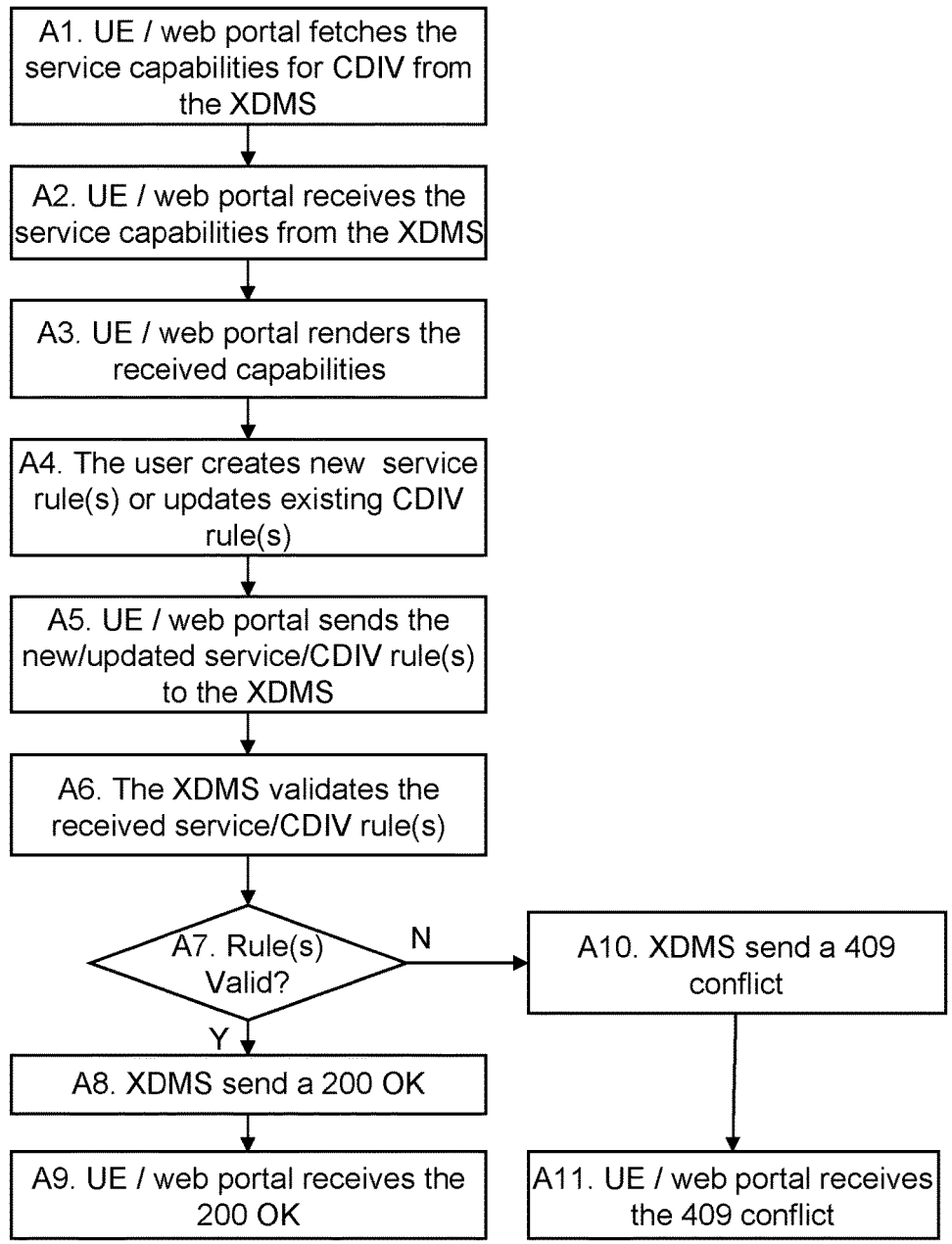
FIG. 3 is a flow diagram illustrating an example of a process of identifying and changing the informational elements for changeable service rules according to the invention.

FIG. 3 is a flow diagram illustrating an example of a process according to the invention for identifying and changing service rules associated with received informational elements indicating the corresponding service rules are changeable or not. In this example, the process provides system for controlling user changeable IP Multimedia Subsystem service rules associated with the user. The service rules are defined using service capabilities, conditions or actions represented by informational elements within an XML document and maintained within the IMS network (e.g. at an HSS (not shown)). The steps performed are as follows:

A1. A UE or web portal requests or fetches the service capabilities associated with a user for a service (e.g. the CDIV service or CB service etc.) from an XDMS in the IMS network. The service capabilities are represented as informational elements in an XML document or fragment thereof and requested from the XDMS server over a Ut interface of the IMS network. The informational element(s) may specify conditions for whether changes to the corresponding service rule is allowed and/or disallowed.

A2. The UE or web portal receives the service capabilities from the XDMS. This information may take the form of an XML document or a fragment thereof that is retrieved by the XDMS from a HSS and transmitted to the UE or web portal over the Ut interface. The XML document or fragment thereof includes one or more informational elements identifying whether a corresponding service rule is changeable by the user and, where, at least one of the informational elements (e.g. service capabilities, actions or conditions) corresponds to at least one of an unconditional and/or immediate based service rule. For example, the XML document or fragment thereof may include a plurality of informational elements corresponding to service capabilities of one or more services, where one or more of the informational element(s) may correspond to unconditional based service rule(s) and/or one or more of the informational element(s) may correspond to immediate based service rule(s), A3. The UE or web portal renders the received capabilities, which includes interpreting the informational elements and presenting to the user an indication in relation to whether the corresponding service rules are changeable. The UE or web portal may present the options or service rules that the user is allowed to use and/or change, where non allowed options or service rules are either not shown at all or, for example, shown by gray-marked and not selectable. The UE may include a graphical user interface for interpreting and displaying the options or service rules that are changeable.

A4. The user selects options and/or creates new service rule(s) or updates to existing service rule(s) (e.g. CDIV rule(s)). This includes the UE or web portal receiving user defined service rule information associated with the service rules and/or options that the user wishes to change. The user defined service rule information may include one or more new service rule(s), one or more user defined informational element(s) that can be used to change the corresponding service rule(s), and/or options that can be used to change the corresponding service rule(s). As an option, the user defined service rule information may be validated by the UE or the web portal to determine whether they correspond to allowable changes in respect of the associated service rules.

A5. The UE or web portal sends the user defined service rule information (e.g. CDIV rule(s)) to the XDMS, over the Ut interface, for use by the IMS network in updating or inserting one or more service rule(s) based on the user defined service rule information, which may be defined in the XML document at the HSS.

A6. The XDMS validates the service rules associated with the user defined service rule information (e.g. CDIV or CB rule(s), etc.). The user defined service rule information indicates changes to corresponding service rules defined in the subscription associated with the user. The XDMS then validates these changes to determine whether the changes or proposed changes to the service rule(s) are allowable or not.

A7. If the service rule(s) corresponding to the user defined service rule information are valid and allowed to be changed, then the process proceeds to step A8. However, if the service rule(s) are not valid or are not allowed to be changed, then the process proceeds to step A10.

A8. The XDMS sends a notification message (e.g. a 200 OK message) to the UE or the web portal acknowledging that the updated or new service rule(s) are valid and have been updated or added to the corresponding service rules set.

A9. The UE or web portal receives the notification message (e.g. 200 OK message) and then the UE or web portal notifies or presents the message to the user accordingly.

A10. XDMS sends a negative response message (e.g. a 409 Conflict message) to the UE or web portal indicating at least a portion of the service rules are invalid or changes are disallowed. This includes notifying the user that at least a portion of the user defined service rule information may be associated with an unchangeable service rule, which may be an unchangeable unconditional or unchangeable immediate based service rule, and changes are disallowed.

A11. The UE or web portal receives the negative response message (e.g. 409 Conflict message) and notifies or presents the message to the user accordingly.

FIG. 4 illustrates schematically an example of an apparatus configured to operate within an IMS network as an XDMS 1 that is adapted or configured to implement the methods and/or processes described herein. The XDMS 1 can be implemented as a combination of computer hardware and software. The XDMS 1 includes a processing unit 2, a memory unit 3, a receiver 4, and a transmitter 5, the processing unit 2 being coupled to the memory unit 3, receiver 4, and transmitter 5. The receiver 4 is configured for receiving messages sent from a UE or web portal over the Ut interface. The transmitter 5 is configured for sending messages to the UE over a Ut interface. The receiver 4 and transmitter 5 are further configured for retrieving an XML document or fragment thereof and storing XML documents and fragments thereof at an HSS over a Sh interface.

The memory unit 3 includes a rule configuration unit 7 for translating user defined service rule information into XML documents or fragments thereof, and a rule validation unit 8 for use in validating the service rules associated with user defined service rule information and sending notifications for the user. The processing unit 2 is configured for determining whether the service rules associated with the user stored at a HSS differ from the service rules required by or received, in the form of user defined service rule information, from the UE or web portal. If these differ then the user requires changes to be implemented to their service rules. The processing unit 2 validates the new or changed service rules before updating the allowed corresponding service rules associated with the user in the HSS. The processing unit 2 is configured for notifying the user via the UE or web portal whether any service rules corresponding to at least a portion of the user defined service rule information are disallowed.

The XDMS 1 is arranged in use to manage an XML document defining IMS service rules for a subscription associated with a user, the XML document or a fragment thereof comprising one or more informational elements identifying whether a corresponding service rule is changeable by the user. One or more of the informational element(s) correspond to one or more unconditional based service rules and/or one or more immediate based service rule(s). The XDMS 1 is further arranged to accept or deny user requests to change the service rules contained within the document based on user defined service rule information.

In operation, the receiver 4 receives a request, over the Ut interface of the IMS network, for service rules associated with the user. This request may be received from a UE or a web portal on behalf of the user. After retrieving the XML document or fragment thereof from the HSS over the h interface, the transmitter 5 transmits, over the Ut interface, the XML document or a fragment thereof comprising one or more informational elements identifying whether a corresponding service rule is changeable by the user. One or more of the informational element(s) correspond to one or more unconditional based service rules and/or one or more immediate based service rule(s).

The receiver 4, in response to transmitting the XML document or fragment thereof, receives user defined service rule information associated with new service rules or service rules to be changed. The user defined service rule information includes data representative of changes to the corresponding service rules associated with the user. The processing unit 2 validates the user defined service rule information to determine the allowable changes to the associated service rules. The processing unit 2 updates the XML document at the HSS to reflect changes to the service rules based on allowable user defined service rule information. In addition, the transmitter 5 may be configured to transmit a notification to the user indicating that at least a portion of the user defined service rule information associated with at least one of an unchangeable unconditional or immediate based service rule is disallowed.

FIG. 5 illustrates schematically an example of an apparatus for operating as a UE 10 that is adapted or configured to implement the methods and/or processes described herein. The UE 10 can be implemented as a combination of computer hardware and software. The UE 10 includes a user input device 11, a processing unit 12, a memory unit 13, a receiver 14, and a transmitter 15, the processing unit 12 being coupled to the user input device 11, memory unit 13, receiver 14, and transmitter 15. The user input device 11 is configured for receiving user input from a user, the user input device 11 may include a keypad, a touch screen, or any other device for receiving user input. The receiver 14 is configured for receiving messages sent from the XDMS 1 over the Ut interface or from a web portal 20. The transmitter 15 is configured for sending messages to the XDMS 1 over the Ut interface or to the web portal 20.

The memory unit 13 includes a rule configuration unit 17 for translating user inputs related to changing service rules into user defined service rule information, and a user input unit 16 for translating user inputs and sending the relevant inputs to the rule configuration unit 17. The UE 10 may also include a rule validation unit (not shown) for use in validating the service rules associated with user defined service rule information and sending notifications to the user accordingly. The processing unit 12 is configured for interpreting informational elements in an XML document or fragment thereof received from the XDMS 1 or received from a web portal 20 and for presenting to the user an indication in relation to whether the corresponding service rule(s) can be changed. The processing unit 12 is further configured to receive user input for use in generating user defined service rule information, where the user defined service rule information represents data indicating changes or additions to the service rules of the subscription associated with the user. The processing unit 12 is also configured for notifying the user via the UE or web portal whether any service rules corresponding to at least a portion of the user defined service rule information are disallowed.

In operation, the UE 10 is configured for controlling user changeable IMS service rules for a subscription associated with the user. The service rules are defined within an XML document and maintained within the IMS network. The transmitter 15 is configured for requesting the service rules associated with the user from an XDMS 1 over a Ut interface of the IMS network or from a web portal 20 having access to the IMS network. The receiver 14 is configured for receiving, over the Ut interface, the XML document or a fragment thereof including one or more informational elements identifying whether a corresponding service rule is changeable by the user. One or more of the informational element(s) correspond to one or more unconditional based service rule(s) and/or one or more immediate based service rule(s). The processing unit 12 is configured for interpreting the informational elements and presenting to the user (via a display or graphical user interface (not shown)) an indication in relation to whether the corresponding service rule(s) can be changed. The user input device 11 receives user inputs associated with changing service rules and/or inserting new service rules and the processing unit 12 and/or memory unit 13 generates user defined service rule information based on the user input. The user defined service rule information represents data indicating changes or additions (or deletions) to the service rules associated with the user. The transmitter 15 is configured for transmitting to the XDMS 1, over the Ut interface, (or to the web portal 20) the user defined service rule information for use by the IMS network in updating the service rules associated with the user.

In addition, the processing unit 12 may be further configured for validating the user defined service rule information to determine the allowable changes to the associated service rules. The transmitter 15 may be further configured for transmitting to the XDMS 1, over the Ut interface, the allowable portions of the user defined service rule information for use by the IMS network in updating the service rules associated with the user. In addition, the receiver 14 may be configured to receive a notification from the XDMS 1 or from a web portal 20, the notification indicating to the user that at least a portion of the user defined service rule information associated with at least one of an unchangeable unconditional or immediate based service rule (or any other service rule) is disallowed.

Figure 6:
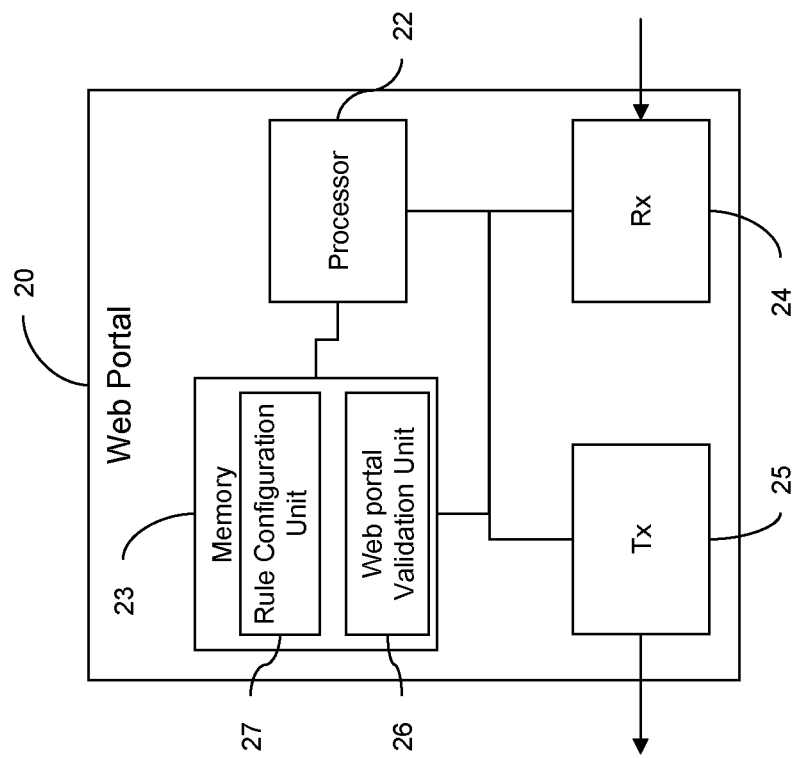
FIG. 6 illustrates schematically an example of a web portal suitable for implementing the methods described herein.

FIG. 6 illustrates schematically an example of an apparatus for operating as a web portal 20 that is adapted or configured to implement the methods and/or processes described herein. The web portal 20 can be implemented as a combination of computer hardware and software. The web portal 20 includes a processing unit 22, a memory unit 23, a receiver 24, and a transmitter 25, the processing unit 22 being coupled to the memory unit 23, receiver 24, and transmitter 25. The receiver 24 is configured for receiving messages sent from a UE (e.g. UE 10) of a user or for receiving messages from the XDMS 1 over the Ut interface. The transmitter 25 is configured for sending messages to the UE of the user or for sending messages to the XDMS 1 over the Ut interface. The memory unit 23 includes a rule configuration unit 27 for translating user inputs from the user that are related to changing service rules into user defined service rule information, and a web portal rule validation unit 26 for use in validating the service rules associated with user defined service rule information and sending notifications to the user accordingly.

The processing unit 22 is configured for interpreting informational elements in an XML document or fragment thereof received from the XDMS 1 and for presenting to the user or to a UE of the user an indication in relation to whether the corresponding service rule(s) can be changed. The processing unit 22 is further configured to receive user input from the user for use in generating user defined service rule information, where the user defined service rule information represents data indicating changes or additions to the service rules associated with the user. The processing unit 22 may be further configured to receive user defined service rule information from a UE 10. The processing unit 22 may validate the new or changed service rules before transmitting data representative of the user defined service rule information to the XDMS 1 via the Ut interface for use in updating the service rules associated with the user. The processing unit 22 is also configured for notifying the user via the whether any service rules corresponding to at least a portion of the user defined service rule information are disallowed.

In operation, the web portal 20 is configured for controlling user changeable IMS service rules associated with the user. The service rules are defined within an XML document and maintained within the IMS network. The transmitter 25 is configured for requesting the service rules for a subscription associated with the user from the XDMS 1 over the Ut interface of the IMS network. The receiver 24 is configured for receiving, over the Ut interface, the XML document or a fragment thereof including one or more informational elements identifying whether a corresponding service rule is changeable by the user. One or more of the informational element(s) correspond to one or more unconditional based service rule(s) and/or one or more immediate based service rule(s). The processing unit 22 is configured for interpreting the informational elements and presenting to the user (via the UE of the user, a display or graphical user interface (not shown)) an indication in relation to whether the corresponding service rule(s) can be changed. The receiver 24 or processing unit 22 receives user inputs associated with changing service rules and/or inserting new service rules and from these inputs the processing unit 22 and memory unit 23 generates user defined service rule information based on the user input. The user defined service rule information represents data indicating changes or additions (or deletions) to the service rules associated with the user. Alternatively or additionally, the receiver 24 receives user defined service rule information from the UE of the user. The transmitter 25 is configured for transmitting to the XDMS 1, over the Ut interface, (or to the web portal 20) data representative of the user defined service rule information for use by the IMS network in updating the service rules associated with the user.

In addition, the processing unit 22 may be further configured for validating the user defined service rule information to determine the allowable changes to the associated service rules. The transmitter 25 may be further configured for transmitting to the XDMS 1, over the Ut interface, the data representative of allowable portions of the user defined service rule information for use by the IMS network in updating the service rules associated with the user. In addition, the receiver 24 may be configured to receive a notification from the XDMS 1, the notification indicating to the user that at least a portion of the user defined service rule information associated with at least one of an unchangeable unconditional or immediate based service rule (or any other service rule) is disallowed. The transmitter 25 may be configured to forward the notification to the user via the UE of the user.

It will be appreciated by the person of skill in the art that various modifications may be made to the above described examples and/or embodiments without departing from the scope of the present invention.

The invention claimed is:

1. A method of controlling user changeable IP Multimedia Subsystem, IMS, service rules associated with a user of a user equipment, UE, wherein the service rules are defined within an Extensible Markup Language, XML, document and maintained within the IMS network, the method comprising:
  requesting the service rules associated with the user from an XML Data Management Server, XDMS, over a Ut interface of the IMS network;
  receiving over the Ut interface, the XML document or a fragment thereof comprising a plurality of informational elements identifying whether a corresponding service rule is changeable by the user of the UE, wherein at least one of the informational elements corresponds to a first unconditional or immediate based service rule to which user changes are allowed and a second unconditional or immediate based service rule to which user changes are not allowed, the informational element(s) for each of said first and second unconditional or immediate based service rules including an indication that specifies the conditions for whether changes to said unconditional or immediate based service rule is allowed and/or disallowed, and wherein the indication comprises either a first value indicating the corresponding service rule is changeable by the user of the UE or a second value indicating the corresponding service rule is not changeable by the user of the UE;
  interpreting said informational elements and said indication(s) for said first and second unconditional or immediate based service rules, and displaying said first and second unconditional immediate based service rules to the user on the UE together with an indication of whether the corresponding service rules are changeable by the user of the UE;
  receiving user defined service rule information, wherein the user defined service rule information include changes to the first unconditional or immediate based service rules rule associated with the user of the UE; and
  validating the user defined service rule information to determine the allowable changes to the associated service rules; and
  transmitting to the XDMS, over the Ut interface, the allowable user defined service rule information for use by the IMS network in updating the first unconditional or immediate based service rules rule associated with the user of the UE.

2. A method according to claim 1, wherein said informational element(s) of said one or more service rule(s) specify-conditions for whether changes to the corresponding service rule(s) is allowed and/or disallowed by the user of the UE.

3. A method according to claim 1, wherein the informational element(s) associated with said service rule(s) includes an indication whether the corresponding service rule(s) is changeable by the user of the UE.

4. A method according to claim 3, wherein the indication whether the corresponding-service rule(s) are changeable further comprises a flag with a first value indicating the corresponding service rule(s) is changeable by the user of the UE, or the flag with a second value indicating the corresponding service rule(s) is not-changeable by the user of the UE.

5. A method according to claim 1, further comprising notifying the user that a portion of the user defined service information including changes associated with an unchangeable unconditional or immediate based service rule is disallowed by the user of the UE.

6. A method according to claim 5, wherein notifying the user that a portion of the user defined service information including changes-associated with an unchangeable unconditional or immediate based service rule is disallowed by the user of the UE comprises receiving a 409 Conflict message to the user over the Ut interface.

7. A method according to claim 1, wherein the method is performed by a user terminal.

8. A method as claimed in claim 1, wherein the method is performed by web portal on behalf of the user.

9. A method of controlling user changeable IP Multimedia Subsystem, EMS, service rules associated with a user of user equipment, UE, wherein the service rules are defined within an Extensible Markup Language, XML, document and maintained within the IMS network the method, performed by an XML Data Management Server, XDMS, comprising:
  receiving a request, over a Ut interface of the IMS network, for service rules associated with the user;
  transmitting, over the Ut interface, the XML document or a fragment thereof comprising a plurality of informational elements identifying whether a corresponding service rule is changeable by the user of the UE, wherein at least one of the informational elements corresponds to a first unconditional or immediate based service rule to which user changes are allowed and a second unconditional or immediate based service rule to which user changes are not allowed, the informational element(s) for each of said first and second unconditional or immediate based service rules including an indication that specifies the conditions for whether changes to said unconditional or immediate based service rule is allowed and/or disallowed, and wherein the indication comprises either a first value indicating the corresponding service rule is changeable by the user of the UE or a second value-indicating the corresponding-service rule is not changeable by the user of the UE;
  receiving user defined service rule information in response to transmitting the XML document or fragment thereof, wherein the user defined service rule information comprises changes to the first service rules associated with the user of the UE;
  validating the user defined service rule information to determine the allowable changes to the associated first service rules; and
  updating the first service rules based on allowable user defined service rule information.

10. A method according to claim 9, wherein said informational element(s) of said one or more service-rule(s) specify conditions for whether changes to the corresponding service rule is allowed and/or disallowed.

11. A method according to claim 9, wherein the informational element(s) associated with said service rule(s) includes an indication whether the corresponding service rule(s) is changeable.

12. A method according to claim 11, wherein the indication whether the corresponding service rule(s) is changeable further comprises a flag with a first value indicating the corresponding service rule(s) is changeable, or the flag with a second value indicating the corresponding service rule(s) is not changeable.

13. A method according to claim 9, further comprising transmitting a notification to the user that a portion of the user defined service information associated with an unchangeable unconditional or immediate based service rule is disallowed.

14. A method according to claim 9, wherein the XDMS is in communication with a user terminal.

15. A method according to claim 9, wherein the XDMS is in communication with a web portal on behalf of the user.

16. A method according to claim 9, wherein the step of updating the service rule further comprises updating the XML document to reflect changes to the service rules associated with the user defined service rule information.

17. An apparatus configured to operate as a user equipment for controlling user changeable IP Multimedia Subsystem, IMS, service rules associated with a user, wherein the service rules are defined within an Extensible Markup Language, XML, document and maintained within the IMS network, the apparatus comprising a receiver, a transmitter, a processing unit, and a memory unit, the processing unit coupled to the receiver, the transmitter, and the memory unit, wherein:
- the transmitter is configured for requesting the service rules associated with the user from an XML Data Management Server, XDMS, over a Ut interface of the IMS network;
- the receiver is configured for receiving, over the Ut interface, the XML document or a fragment thereof comprising a plurality of informational elements identifying whether a corresponding service rule is changeable by the user, wherein at least one of the informational elements corresponds to a first unconditional or immediate based service rule to which user changes are allowed and a second unconditional or immediate based service rule to which user changes are not allowed, the informational element(s) for each of said first and second unconditional or immediate based service rules including an indication that specifies the conditions for whether changes to said unconditional or immediate based service rule is allowed and/or disallowed, and wherein the indication comprises either a first value indicating the corresponding service rule is changeable by the user or a second value indicating the corresponding service rule is not changeable by the user;
- the processing unit is configured for;
  - interpreting said informational elements and said indication(s) for said first and second unconditional or immediate based service rules, and displaying to the user whether the corresponding service rule(s) are changeable by the user; and
  - receiving user defined service rule information, wherein the user defined service rule information indicates changes to the first service rules associated with the user; and
- validating the user defined service rule information to determine the allowable changes to the associated service rules; and
- the transmitter is configured for transmitting to the XDMS, over the Ut interface, the user defined service rule information for use by the IMS network in updating the first service rules associated with the user.

18. An apparatus according to claim 17, wherein:
the transmitter is further configured for transmitting to the XDMS, over the Ut interface, the allowable portions of the user defined service rule information for use by the IMS network in updating the service rules associated with the user.

19. An apparatus configured to operate as web portal for controlling user changeable IP Multimedia Subsystem, IMS, service rules associated with a user of a user equipment, UE, wherein the service rules are defined within an Extensible Markup Language, XML, document and maintained within the IMS network, the apparatus comprising a receiver, a transmitter, a processing unit, and a memory unit, wherein:
- the transmitter is configured for requesting one or more service rules associated with the user from an XML Data Management Server, XDMS, over a Ut interface of the IMS network;
- the receiver is configured for receiving, over the Ut interface, the XML document or a fragment thereof comprising a plurality of informational elements identifying whether a corresponding service rule is changeable by the user of the UE wherein at least one of the informational elements corresponds to a first unconditional or immediate based service rule to which user changes a allowed and a second unconditional or immediate based service to which user changes are not allowed, the informational element(s) for each of said first and second unconditional or immediate based service riles including an indication that specifies the conditions for whether changes to said at least one unconditional or immediate based service rule is allowed and/or disallowed, and wherein the indication comprises either a first value indicating the corresponding service rule is changeable by the user of the UE or a second value indicating the corresponding service rule is not changeable by the user of the UE;
- the processing unit is configured for interpreting said informational elements and said indication(s) for said first and second unconditional or immediate based service rules, and displaying to the user whether the corresponding service rules are changeable by the user of the UE;
- the processing unit is further configured for receiving user defined service rule information, wherein the user defined service rule information comprises changes to the first service rules associated with the user; and
- validating the user defined service rule-information to determine the allowable changes to the associated service rules; and
- the transmitter is further configured for transmitting to the XDMS, over the Ut interface the user defined service rule information for use by the IMS network in updating the first service rules associated with the user of the UE.

20. An apparatus according to claim 19, wherein:
the transmitter is further configured for transmitting to the XDMS, over the Ut interface, the allowable portions of the user defined service rule information for use by the IMS network in updating the service rules associated with the user.

* * * * *

UNITED STATES PATENT AND TRADEMARK OFFICE
CERTIFICATE OF CORRECTION

PATENT NO. : 10,218,565 B2
APPLICATION NO. : 14/387914
DATED : February 26, 2019
INVENTOR(S) : Mikael Forsberg Page 1 of 2

It is certified that error appears in the above-identified patent and that said Letters Patent is hereby corrected as shown below:

In the Specification

In Column 1, Line 56, delete "Call/Session" and insert -- Call Session --, therefor.

In the Claims

In Column 21, Line 29, in Claim 1, delete "unconditional immediate" and insert -- unconditional or immediate --, therefor.

In Column 21, Lines 47-48, in Claim 2, delete "specify-conditions" and insert -- specify conditions --, therefor.

In Column 21, Line 55, in Claim 4, delete "corresponding-service" and insert -- corresponding service --, therefor.

In Column 21, Line 59, in Claim 4, delete "not-changeable" and insert -- not changeable --, therefor.

In Column 22, Line 1, in Claim 6, delete "changes-associated" and insert -- changes associated --, therefor.

In Column 22, Line 8, in Claim 8, delete "by web" and insert -- by a web --, therefor.

In Column 22, Line 10, in Claim 9, delete "EMS," and insert -- IMS, --, therefor.

In Column 22, Line 10, in Claim 9, delete "of user" and insert -- of a user --, therefor.

In Column 22, Line 13, in Claim 9, delete "network the" and insert -- network, the --, therefor.

In Column 22, Line 34, in Claim 9, delete "value-indicating" and insert -- value indicating --, therefor.

Signed and Sealed this
Fourth Day of June, 2019

Andrei Iancu
*Director of the United States Patent and Trademark Office*

CERTIFICATE OF CORRECTION (continued)
U.S. Pat. No. 10,218,565 B2

In Column 22, Line 35, in Claim 9, delete "corresponding-service" and insert -- corresponding service --, therefor.

In Column 22, Line 48, in Claim 10, delete "service-rule(s)" and insert -- service rule(s) --, therefor.

In Column 22, Line 56, in Claim 12, delete "changeable" and insert -- changeable, --, therefor In Column 23, Line 4, in Claim 16, delete "rule" and insert -- rules --, therefor.

In Column 23, Line 39, in Claim 17, delete "for;" and insert -- for: --, therefor.

In Column 23, Line 44, in Claim 17, delete "user; and" and insert -- user; --, therefor.

In Column 24, Line 12, in Claim 19, delete "XML" and insert -- XML, --, therefor.

In Column 24, Line 19, in Claim 19, delete "UE" and insert -- UE, --, therefor.

In Column 24, Line 22, in Claim 19, delete "changes a allowed" and insert -- changes are allowed --, therefor.

In Column 24, Line 26, in Claim 19, delete "service riles" and insert -- service rules --, therefor.

In Column 24, Line 44, in Claim 19, delete "rule-information" and insert -- rule information --, therefor.

In Column 24, Line 48, in Claim 19, delete "interface" and insert -- interface, --, therefor.